United States Patent

[11] 3,584,642

| [72] | Inventor | Robert M. Wilson<br>Battle Creek, Mich. |
|---|---|---|
| [21] | Appl. No. | 750,309 |
| [22] | Filed | Aug. 5, 1968 |
| [45] | Patented | June 15, 1971 |
| [73] | Assignee | Dare Products Incorporated<br>Battle Creek, Mich. |

[54] FLOAT CONTROLLED VALVE ASSEMBLY
10 Claims, 11 Drawing Figs.

[52] U.S. Cl. ..................................... 137/270,
137/448, 251/357, 119/78, 285/158
[51] Int. Cl. ..................................... G05d 9/02
[50] Field of Search ........................... 137/104,
269, 270, 315, 399, 410, 414, 428, 434,
436, 437, 439, 445, 448, 602, 798, 516.29;
119/78, 79, 80; 251/357, 360, 361, 362, 363;
285/158, 212, 213—216, 329, 355, 382, 382.4

[56] References Cited
UNITED STATES PATENTS

| 3,232,314 | 2/1966 | Koester | 137/516.29 |
| 484,384 | 10/1892 | Whittingham | 251/363 X |
| 2,703,099 | 3/1955 | Smallegan | 119/78 X |
| 2,955,847 | 10/1960 | McKenna | 285/329 X |
| 3,003,795 | 10/1961 | Lyon | 285/212 |
| 3,270,770 | 9/1966 | Wilson | 137/448 X |
| 3,354,909 | 11/1967 | Wallgren | 251/357 X |

*Primary Examiner*—M. Cary Nelson
*Assistant Examiner*—David R. Matthews
*Attorney*—Roy A. Plant

ABSTRACT: The present invention relates broadly to float valve assemblies and more specifically to such assemblies which are adapted for use with an inlet connection of either pipe-type or hose-type, and which have inlet orifice means for producing a nonsiphoning float valve assembly particularly adapted for use in stock watering tanks.

PATENTED JUN 15 1971 3,584,642

INVENTOR
ROBERT M. WILSON

BY *Roy A. Plant*

ATTORNEY

INVENTOR
ROBERT M. WILSON

BY Roy A. Plant

ATTORNEY

INVENTOR
ROBERT M. WILSON
BY Roy A. Plant
ATTORNEY

FLOAT CONTROLLED VALVE ASSEMBLY

BACKGROUND OF THE INVENTION

This invention is an improvement on the float controlled valve assembly set forth in my U.S. Pat. No. 3,270,770, granted Sept. 6, 1966.

There have been many types of float valves proposed for maintaining a rather uniform liquid level in a tank with a few of them proposed for use in stock watering tanks. Quite commonly, before the construction shown in my above noted patent came onto the market, float valves were of the exposed float-type, or at least semiexposed, and were not wholly satisfactory for stock watering tank use since the inherent curiosity and "nuzzling" of farm animals, such as horses and cattle, would quickly damage the valve mechanism and commonly render it inoperative. Even those float valves which had been previously best suited for use in stock watering tanks, such as that shown in my U.S. Pat. No. 3,176,707, which used a plain "Styrofoam" float within an open bottom cover member, gave trouble since the farm animals have been prone, when the water level in the tanks drops, to not only "nuzzle" the valve assembly, but also to lick under the housing and either damage the rough surface float used in these watering tank valve assemblies, or through it interfere with the pivot mechanism or the water inlet control valve so that it would not properly operate to control the flow of water into the tank. Also, it has been discovered that in some cases the water level, particularly with high inlet water pressures, sometimes rose so that it reached the water inlet in the valve assembly which it was felt by some contributed to a siphoning action which permitted contamination of the water in the inlet pipe or hose. It was a recognition of these problems and the need of a more stable and universal use nonsiphoning construction float valve assembly which led to the conception and development of the present invention.

SUMMARY OF THE INVENTION

Accordingly, among the objects of the present invention is the provision of a more stable type of construction for a float valve assembly better adapted for universal use.

Another object of this invention is to provide a float valve assembly which is of nonsiphoning type.

Another object of this invention is to provide a float valve assembly for use with stock watering tanks and adaptable for use with either a pipe inlet or a hose inlet for tank filling water, and which has a nonsiphoning condition providing inlet orifice (N.S.O.) construction, that is, an orifice sufficiently small to reduce the valve sealing force required to the extent that the inlet can be elevated to a point at least 1 inch above the highest level attainable by the water in the tank.

A further object of this invention is to provide a reversible position float in the housing of the present float valve assembly, with such float being adapted to operate in one position on a pipe inlet and in the other position on a hose inlet, and either inlet being adapted for use of a nonsiphoning orifice (N.S.O.).

A further object is to provide such a float valve assembly with s housing having reinforced inlets into the housing, with such reinforcement being in the form of internally threaded metal bushings.

Still further objects and advantages of this invention will appear as the description proceeds.

BRIEF DESCRIPTION OF DRAWINGS

To the accomplishment of the foregoing and related ends, the invention, then, consists of float valve assembly means and features hereinafter fully described and particularly pointed out in the claims, the annexed drawings and the following description setting forth in detail certain illustrative embodiments of the invention, such disclosed embodiments illustrating, however, but several of the various ways in which the principle of the invention may be used.

In the annexed drawings.

DESCRIPTION OF SPECIFIC EMBODIMENTS

Figure 1:
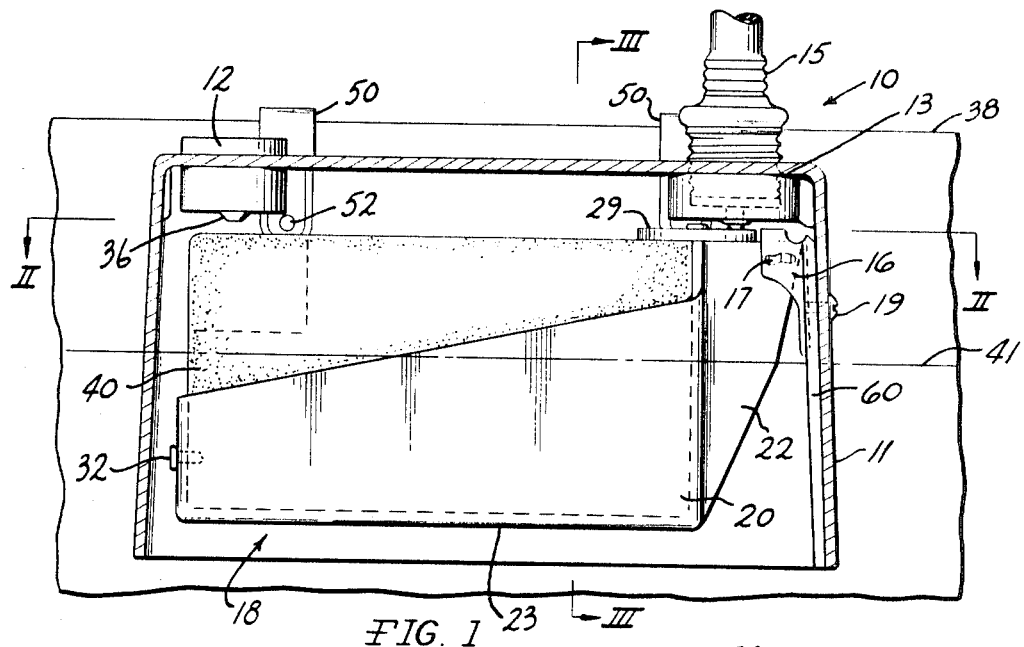
FIG. 1 shows a partially sectioned side elevation assembly view of one form of the improved float valve assembly of the present invention as taken along line I–I of FIG. 2, looking in the direction of the arrows.
Figure 2:
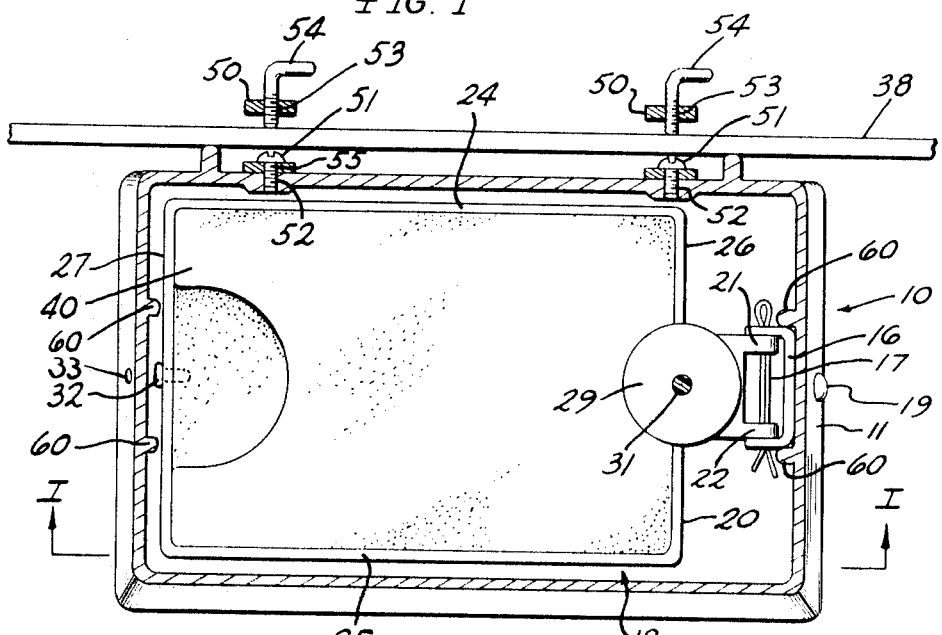
FIG. 2 shows a partially sectioned top view of one form of the present invention as taken along line II–II of FIG. 1, looking in the direction of the arrows.
Figure 5:
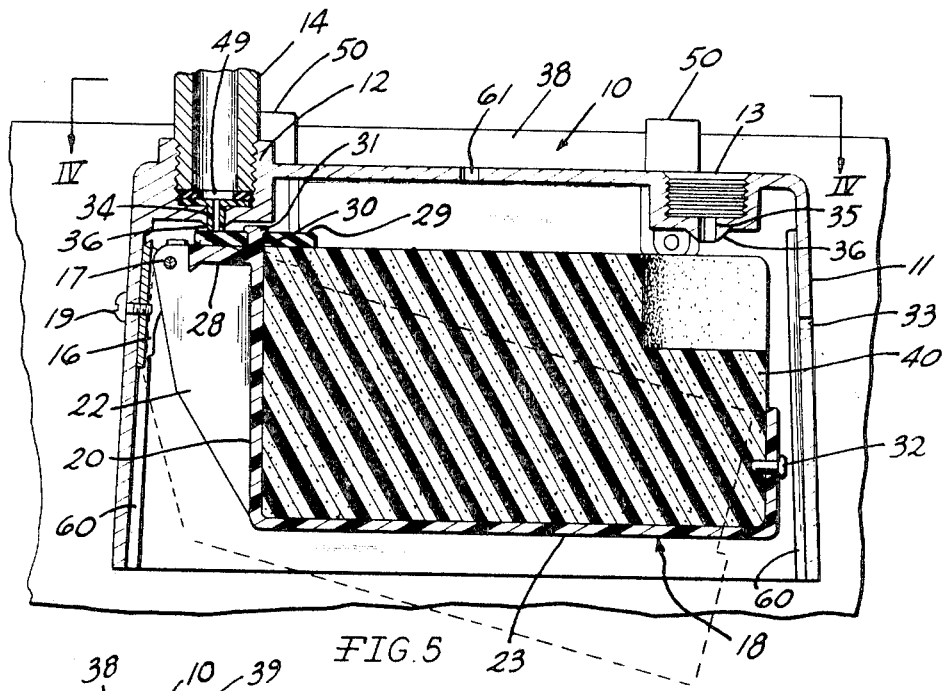
FIG. 5 is a vertical longitudinal section as taken along line V–V of FIG. 4, looking in the direction of the arrows.

Referring more particularly to FIGS. 1, 2 and 5, it will be noted that the float valve assembly 10 has a metal housing 11 which in this particular form is aluminum. This housing has in its top two inlets 12 and 13 with inlet 12 threaded for reception of standard metal pipe 14, while inlet 13 is threaded for a conventional hose coupling end 15. The assembly thus is adapted for use with either hose or pipe connections to a source of inlet water supply (not shown) and makes the assembly more universal in its adaptability for use. Mounted on the inside of one end of housing 11 is a support member 16 on which, by means of a pivot member 17, which may be in the form of a cotter pin as more specifically shown in FIG. 2, may be mounted a float assembly 18. For convenience, support member 16 may be anchored to the end of housing 11 by means of a screw 19, and held against sidewise turning by means of guide ribs 60, FIG. 2, on the inside face of the adjacent end panel of housing 11.

Mounted on support member 16 by means of said pivot member 17 is a tray 20 having supporting ears 21 and 22. This tray 20 has a bottom panel 23, two side panels 24 and 25 and two end panels 26 and 27, FIGS. 1 and 2. End panel 26 is the one on which supporting ears 21 and 22 are joined. At the top of ears 21 and 22 there is a web or top panel 28, FIG. 5, which acts as a support for a resilient washer 29 which in turn has a substantially central perforation 30 through which a post 31 extends and may be of any conventional type although preferably, as shown in FIG. 5, this post is of plastic and is an extending part of tray 20 with the upper end of this post being headable, as shown, by applying heat to same. This leaves resilient washer 29 firmly held in place by friction and yet allowing same to be rotated to provide fresh sealing areas as will be hereinafter explained.

Mounted in tray 20 is a float 40 preferably of nonwaterlogable material, which may be formed of plastic full of small closed bubbles such as "Styrofoam." One end of this float comes up underneath resilient washer 29 which forms a stop for same while the other end of this float is preferably anchored in place by means of a screw 32. It is to be noted that housing 11 preferably has an air vent 61 and is provided with a second perforation 33 so that the float assembly 18 can be reversed in the housing and anchored in place between guide ribs 60 by means of screw 19 passing through this second perforation 33 for anchoring support member 16 in reverse position in housing 11 thus making the assembly adaptable for operation with either water supply through the pipe connection 14 or the hose connection 15.

Figure 6:
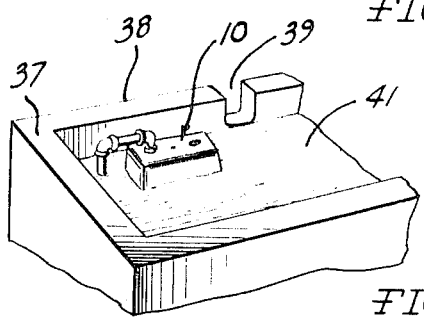
FIG. 6 is a perspective view of one form of the improved float valve assembly of the present invention installed on a metal pipe wholly within a stock watering tank having an overflow opening.

The bottom of threaded inlets 12 and 13 are preferably supplied with substantially uniform size openings 34 and 35, FIG. 5, with a projecting circular inlet shoulder 36 which under ordinary conditions is adapted to seal on resilient washer 29, which is rotatable to provide a fresh sealing surface whenever desired, with sealing taking place when float assembly 18 is lifted by the water in the tank 37, one wall 38 of which is shown in several views as being utilized for supporting the float valve assembly, which is a variation of the construction shown in FIG. 6. This tank 37 is preferably provided with an overflow opening 39, FIG. 6, which allows the float valve assembly to be mounted deeper into the tank where there is a little less danger of the float valve assembly being accidentally injured by the stock being watered. These opening 34 and 35, in accordance with common construction which has prevailed for several years, are approximately three-sixteenths inch in diameter and thus allow the water pressure in the water inlet supply line to press against the resilient washer 29 over that amount of area to resist sealing of the valve assembly 38 until the water level rises to a point where the float 40 exerts sufficient force to close the inlet and thus determine the maximum level of water 41, FIGS. 1 and 6. If the openings 34 and 35 were smaller there would be less inlet area subject to water pressure and the float 40 would be able to check the flow of water into the tank through the inlet without the float 40 floating as deep in the water of the tank as would be the case if the pressure were high, for instance, at the maximum which has been used in the past. HOwever, since pumping systems vary in the water flow pressure over a wide range, it is desirable to be able to adapt the float valve assembly 10 to meet all these different operating pressure conditions, a think which makes it desirable to retain standard inlet openings 34 and 35 and then provide means to vary the size of the opening through which the water flows and thus make the assembly universal for a purpose to be hereinafter explained. Also where there is an installation of one of these float valve assemblies which allows the tank water to rise to siphoning level, same can be corrected by dropping a suitable size orifice member 45 into opening 34.

For many years all that was required was that there be water in a tank for the stock to drink, and this water was supplied to all kinds of stock such as horses, sheep, cattle and even dairy cows. More recently, however, it has been found that sometimes foreign matter, including bacteria of a dangerous type, gets into the water tank and if the level of the water in the tank is high enough to reach the top of the resilient washer 29, there may be a siphoning effect wherein some of this bacteria will get back into the main inlet water line and contaminate the water supply, which may be connected, for instance, to other stock watering tanks or the like with separate animals using same. In view of this situation several States have promulgated regulations wherein float valve assemblies must be such that there can be no siphoning of water back into the main line under any condition and the present invention is aimed at meeting this situation, regardless of the inlet water pressure while maintaining the substantially universally used float valve assembly construction which has proved so highly successful over many years of commercial use. The features of this improvement will be hereinafter described in detail.

As noted above, a number of states, particularly where dairying is important, have set up regulations requiring a "-nonsiphoning" float valve construction in connection with the water supply inlet to animal watering tanks, particularly where dairy herds are involved. In other words, a construction preventing the back siphonage of water from the watering tank into the supply line. Basically, nonsiphoning requirements are simply that the water supply inlet, or inlet orifice inside of the housing 11 of float valve assembly 10 must be elevated to a position above the maximum water level 41 of the stock watering tank 37. The maximum water level is the height to which the water can rise before spilling over the tank rim or through an adequate size safety overflow opening 39 which serves as a safety factor to avoid siphoning difficulties in case of accidental damage to the float valve assembly. Usually, the distance between the inlet orifice inside the housing 11 and the maximum water level 41 must be equal to twice the diameter of the water supply line, but not less than 1 inch.

Figures 8, 9, 11:
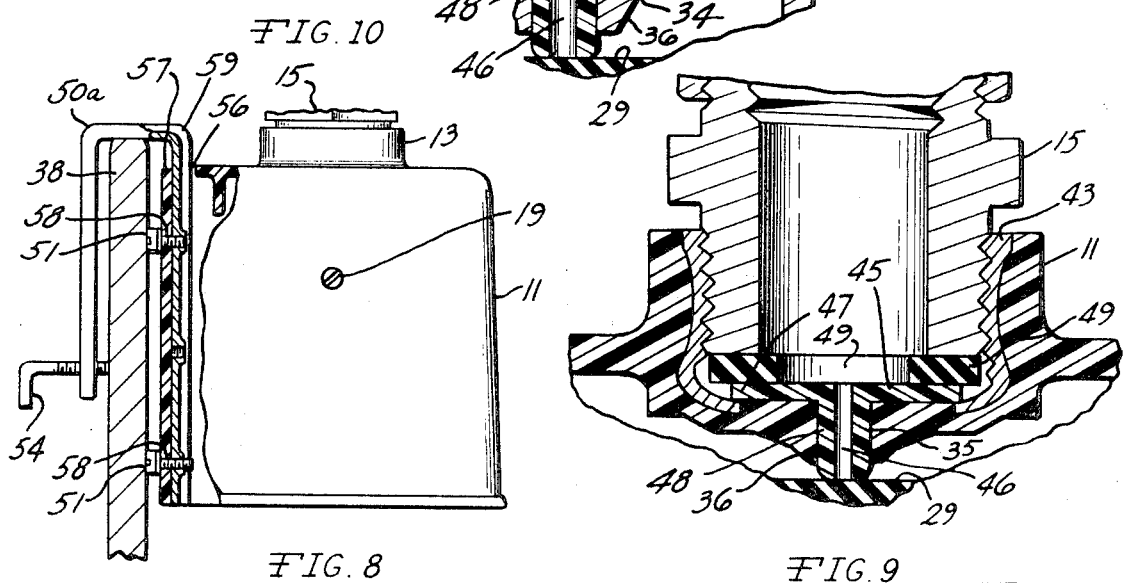
FIG. 8 is a partially sectioned end view showing a means for the variable elevation supporting of the float valve assembly illustrated in FIG. 7.
FIG. 9 is a sectional view of the water inlet portion of the improved float valve assembly having a plastic housing as taken along line IX–IX of FIG. 7, looking in the direction of the arrows.
FIG. 11 is a fragmentary sectional view, similar to FIG. 9, of an improved inlet connection to a metal housing type of improved float valve assembly.

Recognizing that water pumping systems are not all alike and operate at various pressures, it is desirable to have uniform diameter inlet openings 34 and 35, and use a nonsiphoning orifice member 45, FIGS. 9 and 11, to provide the desired opening 46 for the particular pumping pressure involved. This orifice member 45 which preferably is of metal or hard plastic has a disc-shaped head 47 and a cylindrical projection 48 which fits opening 35 and contains centrally thereof passageway 46. The lower end of projection 48 is rounded and perpendicular to the axis of said projection and extends just beyond inlet shoulder 36 to provide a new sealing surface to engage and seal on resilient washer 29. Between disc-shaped head 47 and the bottom of pipe 14, FIG. 11, or hose coupling end 15, FIG. 9, there is preferably used a sealing washer 49. Since pipe threads are tapered it may be necessary to use more than one sealing washer 49, FIG. 11, to form a watertight seal of the end of pipe 14 on said washer thus preventing leakage of water around orifice member 45.

Figure 3:
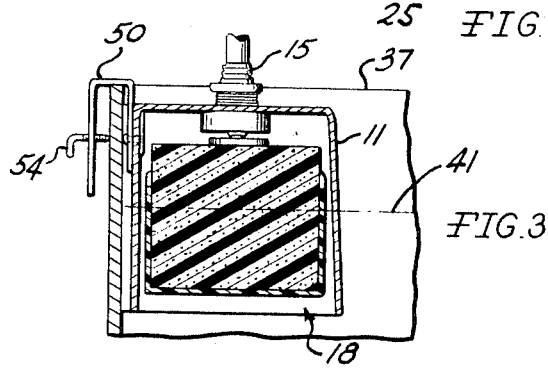
FIG. 3 is a cross-sectional view as taken along line III–III of FIG. 1, looking in the direction of the arrows.
Figure 4:
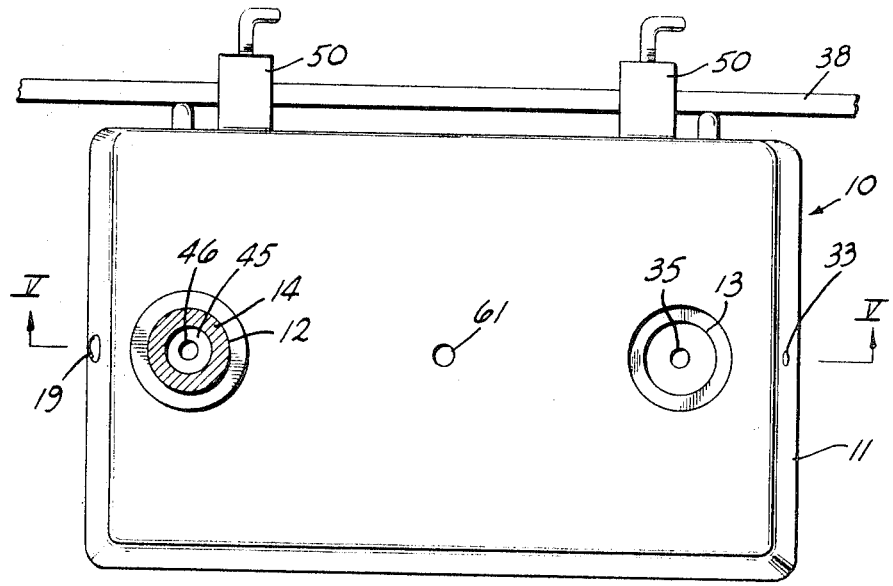
FIG. 4 is a top view of the assembly as taken along line IV–IV of FIG. 5, looking in the direction of the arrows.
Figure 7:
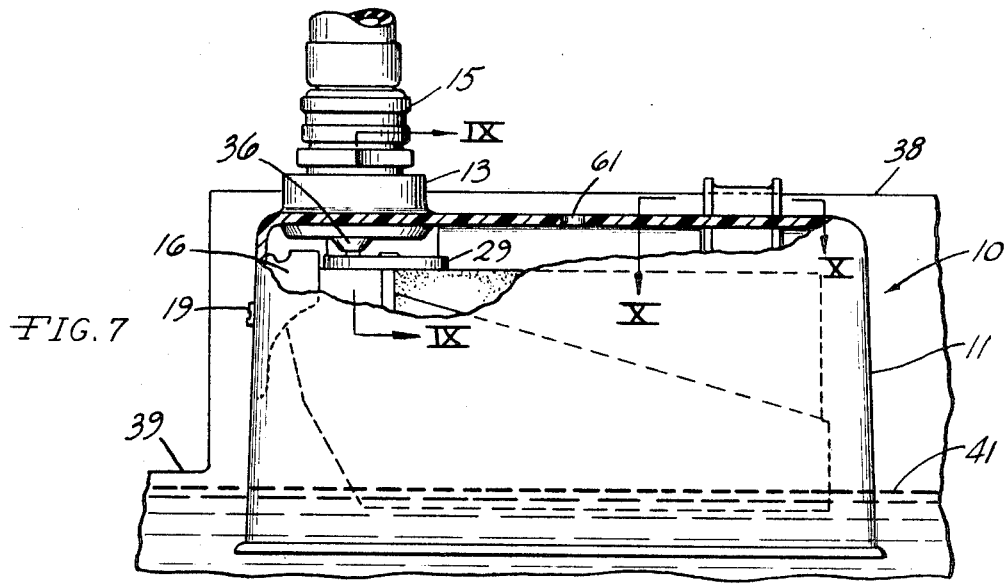
FIG. 7 is a partially sectioned view of another form of the improved float valve assembly of the present invention having only one inlet and installed with a nonsiphoning inlet member in stock watering tank and supported on a sidewall of the latter.
Figure 10:
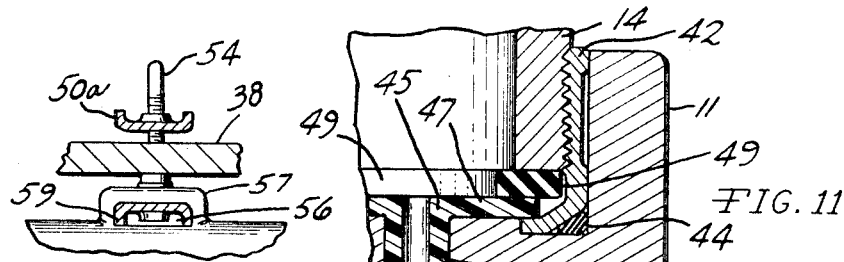
FIG. 10 is a fragmentary sectional view of one of the improved float valve assembly supporting members, as taken along line X–X of FIG. 7, looking in the direction of the arrows.

To make the threads more durable in inlets 12 and 13 of housing 11, same may be provided with suitable internally threaded brass, or other substantially noncorrodable metal, bushings 42 and 43, FIGS. 11 and 9. Where the housing 11 is of metal, FIG. 11, the bushing 42 may be molded, press fit or dropped into place and then expanded to anchor same against turning or removal. Waterproof adhesive may be used to seal the bushing watertight against leakage, or an O-ring 44 may be placed under bushing 42 to prevent leakage from the assembly past the outer face of bushing 42. On the other hand, where the housing is of plastic, FIG. 9, the threaded bushing 43 is preferably conventionally put in the mold and then the plastic molded around same. This overcomes a difficulty which has been encountered due to the user of a plain plastic housing float valve assembly sometimes overtightening the water connection and either stripping the plastic threads or breaking the bottom of the threaded recess. Metal housings, on the other hand, are subject to corrosion, and by using internally threaded brass bushings this difficulty is overcome.

Where the float valve assembly 10 is to be suspended from sidewall 38 of watering tank 37, this may be done in various ways with one being shown in FIGS. 1, 2 and 3 where hanging brackets 50 are of U-shape and provided with screws 51 which pass through suitable spaced apart holes 55, FIG. 2, in bracket 50 and engage threaded openings 52 in the side of housing 11. The outer leg of hanging bracket 50, preferably adjacent the free end of same, is provided with a threaded opening 53 for a thumbscrew 54. Thus, by shifting housing 11 up or down and engaging screw 51 with the desired holes 55 in hanging bracket 50, the height of the float valve assembly 10 relative to the top of tank 37 may be readily determined and a height chosen which prevents siphoning taking place. A second construction for supporting housing 11 on the tank wall 38 is shown in FIGS. 7, 8 and 10. Here it will be noted that housing 11 has openings 56 in its upper panel at the sidewall of same where it is provided with a projecting rib 57 in which hanging bracket 50a slidably fits. The backwall of housing 11 is provided with perforations 58 for screws 51 which fit threaded openings in hanging bracket 50a. This hanging bracket 50a differs from bracket 50 mainly by having out-turned edges 59 which stiffen the bracket and further stabilize the mounting and anchoring of the float valve assembly 10.

While preferred embodiments of the invention have been illustrated and described herein, it is to be understood that modifications may be made in the float valve assembly and its elements within the spirit and scope of the invention as herein described and illustrated. It is further to be noted that while directional terms have been used, same are not to be construed as a limitation of the invention since such use has been availed of to better describe the invention as above set forth and illustrated in the drawings.

Other modes of applying the principle of my invention may be employed instead of those explained, change being made as regards the float valve apparatus and mechanism herein disclosed provided the means and features stated by any of the following claims or the equivalents of such stated means and features be employed.

I therefore particularly point out and distinctly claim as my invention:

1. A float valve assembly for stock watering tanks and the like, comprising
   a. a housing of boxlike shape having a top, sides, ends, and an exposed open bottom,
   b. said housing having at least one inlet connection having a bottom with central inlet opening into same through said top adjacent but spaced from one end of same,
   c. said inlet connection having means for connecting same to the end of a supply line for liquid under pressure,
   d. a valve seat portion inside of said housing encircling the inner end of said central inlet opening of said inlet connection,
   e. an orifice member composed of a nondeformable material having a large annular disclike head fitting in the bottom of said inlet connection of said housing and having a cylindrical projection provided with an axial channel extending through said central inlet opening of said valve seat portion and forming a projecting auxiliary valve seat at the discharge end of said axial channel inside of said housing, the diameter of said axial channel at said auxiliary valve seat being not substantially larger than the smallest diameter of said channel along said projection,
   f. means biasing and sealing the large annular disclike head of said orifice member against the bottom of said inlet connection to prevent said orifice member from being dislocated and to prevent leakage around said orifice member,
   g. pivot means at the end of and inside said housing member adjacent said inlet connection,
   h. a sealing valve member in the form of a resilient washer for sealing on said auxiliary valve seat,
   i. means pivotally mounted on said pivot means at the end of said housing,
   j. means for mounting said sealing valve member in fixed position on said pivotally mounted means for movement in unison with same to and from said auxiliary valve seat,
   k. a float,
   l. means for mounting and supporting said float on said pivotally mounted means wholly within said housing, and
   m. the portion of said float supporting means adjacent the open bottom of said housing also serving as a protective shield for said float.

2. A float valve assembly for watering tanks and the like as set forth in claim 1, wherein
   a. said pivot means at the end of and inside said housing comprises (1) a pivot pin, (2) a support member on which said pin is mounted, and (3) means for fastening said support member on the inner side of said end wall of said housing adjacent said inlet connection.

3. A float valve assembly for watering tanks and the like as set forth in claim 2, wherein
   a. said inner side of said end wall of said receptacle has means for locating said support member in operating position, and
   b. said means for fastening said support member on said end wall is a releasable means.

4. A float valve assembly for watering tanks and the like as set forth in claim 1, wherein
   a. said sealing valve member in the form of a resilient washer is mounted on a central post and firmly held but rotatable around same to present fresh seating surfaces for said auxiliary valve seat when required, and
   b. a supporting means for the underside of said washer in the area below the point of sealing with said auxiliary valve seat.

5. A float valve assembly for watering tanks and the like as set forth in claim 1, wherein
   a. said inlet connection has a cylindrical reinforcing bushing which is strong and of high corrosion resistance,
   b. means anchoring said bushing in place in said inlet connection of said housing in substantially liquidtight manner, and
   c. said bushing having means on its inner surface for operably connecting same to said supply line for liquid under pressure.

6. A float valve assembly for watering tanks and the like as set forth in claim 5, wherein
   a. there is an o-ring in the junction of the outer surface of said bushing with the side and bottom of said inlet connection of said housing for sealing same against leakage around said bushing.

7. A float valve assembly for watering tanks and the like as set forth in claim 1, wherein
   a. said housing has two inlets in the top of same with each being adjacent opposite ends thereof, one being internally threaded for a pipe type of supply line having a tapered pipe thread, and the other for a garden hose type of supply line having a male threaded coupling end, and
   b. said housing having means for shifting said pivot means from one end of said housing to the other so that said float mounting and supporting means can be operably mounted thereon under either of said inlets.

8. A float valve assembly as set forth in claim 7, wherein
   a. said inlet connection has a cylindrical reinforcing bushing which is strong and of high corrosion resistance,
   b. means anchoring said bushing in place in said inlet connection of said housing in substantially liquid tight manner, and
   c. said bushing having means on its inner surface for operably connecting same to said supply line for liquid under pressure.

9. A float valve assembly as set forth in claim 8, wherein
   a. said sealing valve member in the form of a resilient washer is mounted on a central post and firmly held but rotatable around same to present fresh seating surfaces for said auxiliary valve seat when required, and
   b. a supporting means for the underside of said washer in the area below the point of sealing with said auxiliary valve seat.

10. A removable and replaceable orifice member for a float valve assembly according to claim 2, comprising a large annular disclike head fitting and a cylindrical projection extending therefrom of a diameter adapted to extend through the central inlet opening of the valve seat portion of said valve assembly and to form a projecting valve seat at the outlet end of said cylindrical projection adapted to be engaged by the sealing valve member of said valve assembly, said orifice member having an axial channel therethrough having a substantially uniform diameter sufficiently small at said auxiliary valve seat to reduce the sealing force required by said sealing valve member to seal the end of said projecting auxiliary valve seat so that said orifice member can be mounted with its lower end at an elevation at least 1 inch above the highest possible water level of the tank on which said float valve assembly is mounted.

PO-1050
(5/69)

UNITED STATES PATENT OFFICE
CERTIFICATE OF CORRECTION

Patent No. 3,584,642          Dated June 15, 1971

Inventor(s) Robert M. Wilson

It is certified that error appears in the above-identified patent and that said Letters Patent are hereby corrected as shown below:

Column 1, line 61, for "s" read --a--.
Column 6, line 58, for "2" read --1--; line 62, after "projecting" insert --auxiliary--.

Signed and sealed this 5th day of September 1972.

(SEAL)
Attest:

EDWARD M.FLETCHER,JR.        ROBERT GOTTSCHALK
Attesting Officer            Commissioner of Patents